(No Model.)
U. S. LANDERS.
AXLE BOX FOR RAILWAY CARS.
No. 518,723. Patented Apr. 24, 1894.
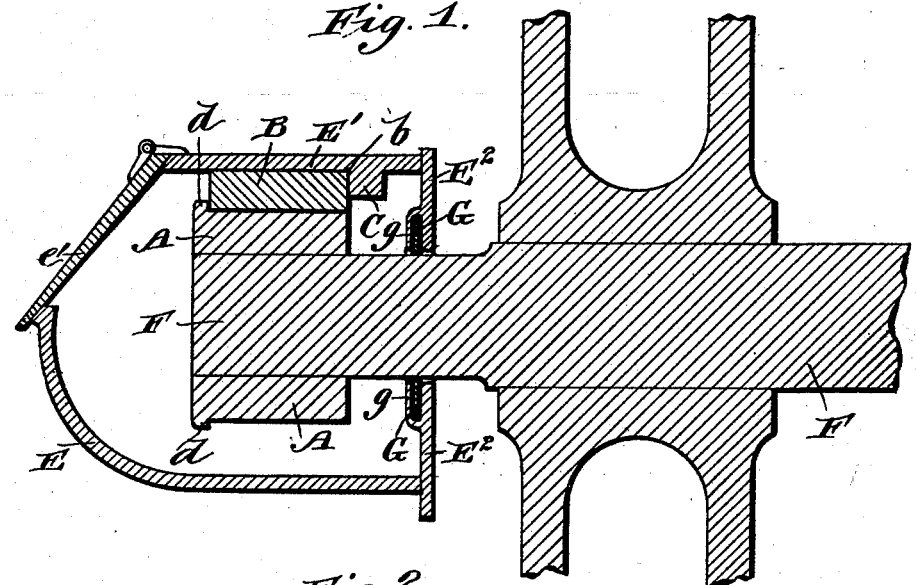
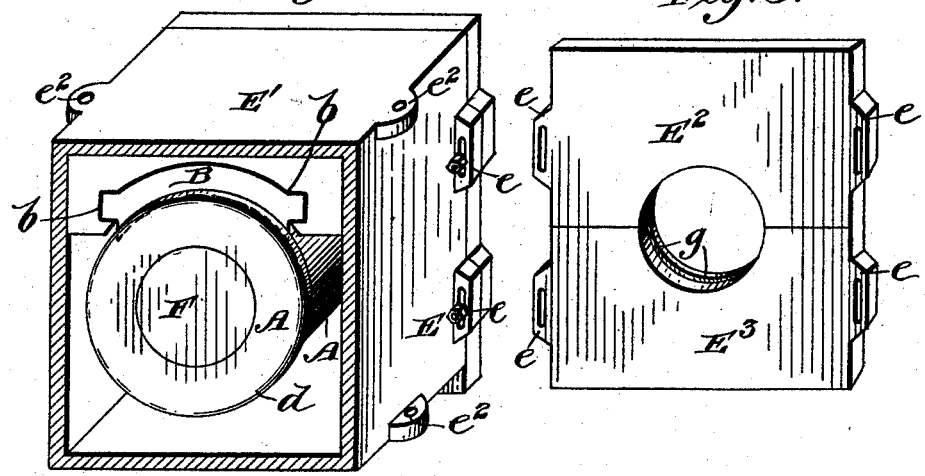
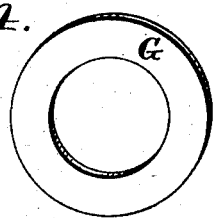
Witnesses
Inventor
Upton S. Landers
by J. F. Johnson
Attorney
THE NATIONAL LITHOGRAPHING COMPANY,
WASHINGTON, D. C.

UNITED STATES PATENT OFFICE.

UPTON S. LANDERS, OF FULFORD, MARYLAND.

AXLE-BOX FOR RAILWAY-CARS.

SPECIFICATION forming part of Letters Patent No. 518,723, dated April 24, 1894.

Application filed July 6, 1893. Serial No. 479,748. (No model.)

*To all whom it may concern:*

Be it known that I, UPTON S. LANDERS, a citizen of the United States, residing at Fulford, in the county of Harford and State of Maryland, have invented certain new and useful Improvements in Axle-Boxes for Railway-Cars, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in axle boxes for railway cars and carriages, and has for its object the provision of an improved axle box that will prevent the waste or leakage of oil therefrom, thus forming a good and reliable reservoir or receptacle for oil or other lubricating material in the bottom of the axle box.

To attain the second object of my invention I provide a suitable back consisting of two parts for the axle box, provided with a suitable washer, or packing if desired, held in a chamber, recess or guide on the back of the axle box, whereby a tight joint is constantly maintained between the axle box and the axle around the axle opening, and means for adjusting the back of the axle box to prevent it cutting the axle as the bushing or "brass" in the axle box is worn away.

The invention further consists in the construction and novel arrangement of the parts hereinafter described, illustrated in the drawings and more particularly pointed out in the claims hereunto appended.

In the drawings: Figure 1 is a longitudinal sectional view of the car axle and axle box showing my improvements applied thereto. Fig. 2 is a perspective view of the box and axle, and bushing or "brass" looking from the front. Fig. 3 is a view showing the back of the axle box made in two sections, and showing a part of the guide, recess or chamber thereon. Fig. 4 is a view of the washer or packing used to surround the axle and make a tight joint between it and the axle box.

Similar letters of reference indicate corresponding parts in all the figures.

Referring to the drawings by letters, F represents a car axle of the usual construction having a wheel shrunk or otherwise secured upon it in the usual manner.

A is a sleeve or jacket of greater diameter than the end of the axle F upon which it is shrunk or otherwise secured and forms the bearing surface or journal of the axle F. The outer edge or circumference of the sleeve or jacket A is provided with a lip or collar $d$, for a purpose hereinafter stated.

E is an axle box of the usual construction, and has set or otherwise rigidly secured in the upper portion thereof a bearing or bushing B, commonly called the "brass," of brass or other suitable material, the bearing surface of which is curved and rides and rests upon the enlarged sleeve or jacket A on the end of the axle E, as shown.

C is a lug or stop secured to the under side of the top E' of the box E, and is for the purpose of holding the bearing or bushing B in place. This stop C prevents the bearing or bushing B from working back to the rear of the axle box, and the lip or collar $d$ on the sleeve or jacket A prevents it from working forward out of the groove $b$ in which it is set. The lip or collar $d$ on the sleeve or jacket A also prevents the longitudinal motion or slipping of the axle with its enlarged jacket or sleeve from the bearing or bushing B toward the back of the box.

The back of the axle box E is removable and is made in two sections $E^2$ $E^3$, as shown.

$e$, $e$, are lugs having slots or elongated openings therein, by means of which the back pieces $E^2$ $E^3$ are secured to the box E, and by means of which the said pieces can be set against the axle, or away from it, as may be desired, and also can be raised so as to prevent the back cutting the axle as the bushing or "brass" B is worn away, as is evident. The lugs $e^2$, $e^2$, at the top and bottom of the axle box are for the passage of the bolts by which the axle box is secured to the car.

On the back sections $E^2$, $E^3$, of the back of the box surrounding the axle opening is a chamber or recess, preferably semi-circular, formed by the pieces $E^2$, $E^2$, and the auxiliary wall $g$, as shown, and is so formed that when the two pieces are placed in position the recess or chamber will be continuous around the axle opening in the back plate of the box. In this chamber or recess surrounding the axle opening is a washer G, which can either turn with the axle E, or remain stationary in the chamber or recess, as is evident. Instead of the washer G this chamber or recess may be filled with suitable packing, but I prefer the use of the washer. The auxiliary wall *g* may be perforated permitting communication between the chamber or recess and the reservoir in the axle box, or instead of the wall *g* being solid or perforated, it may be made toothed so as to form, not an inclosed chamber but merely a retaining rack or guide for the washer or packing. It will thus be seen that by this construction the oil or other lubricant cannot splash or pass out through the axle opening in the back of the box, as has usually been the case, and that a great saving in the lubricating material is made.

The washer G may be of any suitable material, and if desired, it can be made of metal and shrunk upon the axle F making it rigid therewith, so that it will always turn with the axle.

Owing to the peculiar construction of some car trucks it might be necessary to have the bolts that secure the back of the axle box to the body pass through the box on the inside, instead of having them on the outside, as shown in the drawings.

The sections E², E³, may extend back toward the car wheels, and even touch them if desired, to stay the box and prevent it rocking.

Having thus described my invention, what I claim, and desire to secure by Letters Patent of the United States, is—

1. An axle box having a back consisting of two parts, ears or lugs on said back having elongated openings therein, corresponding lugs with openings on the sides of the axle box, and bolts for securing said back to the box, whereby the said parts can be adjusted on the box to close tight around the axle or be moved away from it, as set forth.

2. An axle box having a back consisting of two parts and provided with a recess or chamber surrounding the axle opening on the inside of the box and adapted to hold a washer or suitable packing, ears or lugs on said back having elongated openings therein, corresponding lugs with openings on the rear sides of the axle box, and bolts for securing said back to the box, whereby the said parts can be adjusted on the back of the box to close tight around the axle or be moved away from it, as set forth.

In testimony whereof I affix my signature in presence of two witnesses.

UPTON S. LANDERS.

Witnesses:
GEORGE S. BOOKER,
LOADER JAMES.